US012711291B2

(12) United States Patent
Zheng et al.

(10) Patent No.: US 12,711,291 B2
(45) Date of Patent: Aug. 18, 2026

(54) METHOD BASED ON CONSISTENCY OF DISTRIBUTION FEATURE OF CHECKING-VALIDATION DATA FOR ESTABLISHING HYDROLOGICAL PROCESS MODEL

(71) Applicant: Zhejiang University, Hangzhou city (CN)

(72) Inventors: Feifei Zheng, Hangzhou city (CN); Junyi Chen, Hangzhou city (CN)

(73) Assignee: Zhejiang University, Zhejiang (CN)

(*) Notice: Subject to any disclaimer, the term of this patent is extended or adjusted under 35 U.S.C. 154(b) by 915 days.

(21) Appl. No.: 18/082,699

(22) Filed: Dec. 16, 2022

(65) Prior Publication Data

US 2023/0195976 A1 Jun. 22, 2023

(30) Foreign Application Priority Data

Dec. 17, 2021 (CN) ......................... 202111550447.2
Dec. 17, 2021 (CN) ......................... 202111551770.1

(51) Int. Cl.
*G06F 30/27* (2020.01)
*G06F 113/08* (2020.01)

(52) U.S. Cl.
CPC .......... *G06F 30/27* (2020.01); *G06F 2113/08* (2020.01)

(58) Field of Classification Search
CPC ............................. G06F 30/27; G06F 2113/08
See application file for complete search history.

(56) References Cited

U.S. PATENT DOCUMENTS

2022/0075913 A1* 3/2022 Albert ...................... G06N 3/09
2022/0180153 A1* 6/2022 Botero Halblaub ..... G06N 3/08

OTHER PUBLICATIONS

Zheng, Feifei, et al. "On lack of robustness in hydrological model development due to absence of guidelines for selecting calibration and evaluation data: Demonstration for data-driven models." Water Resources Research 54.2 (2018): 1013-1030. (Year: 2018).*

* cited by examiner

*Primary Examiner* — Chuen-Meei Gan
(74) *Attorney, Agent, or Firm* — MUNCY, GEISSLER, OLDS & LOWE, P.C.

(57) ABSTRACT

The present disclosure provides a method based on consistency of a distribution feature of checking-validation data for establishing a hydrological model. The method includes: S1: proposing an idea of discrete checking of data for a hydrological process model according to S11-S12; S2: using an MDUPLEX method to allocate an original runoff data set D to a checking set C and a validation set E according to S21-S28; and S3: checking and validating the model according to S31-S32, determining a model parameter, and establishing the hydrological process model. The present disclosure guarantees consistency of performance of the hydrological process model during checking and validation periods by means of discrete sampling, so as to improve effectiveness of the hydrological process model and stability of engineering application.

1 Claim, 7 Drawing Sheets

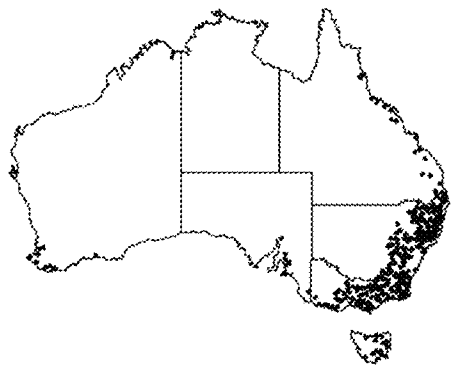
315 catchment areas in Australia
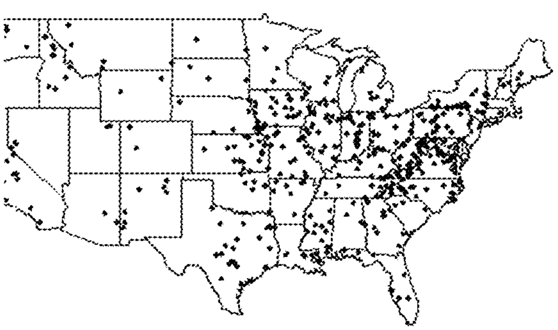
402 catchment areas in the United States
FIG. 2
| Runoff skewness | The number of catchment areas |
|---|---|
| <5 | 226 |
| [5,10) | 239 |
| [10,15) | 150 |
| [15,20) | 69 |
| >20 | 33 |
FIG. 3
| -0.4 | 0.08 | -0.14 | -0.34 | -0.14 | -0.19 | -0.17 | 0.06 | 0.22 |
|---|---|---|---|---|---|---|---|---|
| -0.38 | 0.16 | -0.3 | -0.16 | -0.03 | 0.06 | -0.37 | 0.01 | 0.16 |
| -0.48 | -0.42 | -0.14 | 0.39 | -0.16 | -0.43 | 0.16 | 0.37 | 0.32 |
| -0.13 | 0.06 | 0.21 | 0.25 | 0.21 | 0.09 | -0.26 | -0.36 | -0.31 |
| 0.02 | -0.18 | -0.24 | 0.29 | 0.07 | -0.03 | 0.05 | 0.27 | 0.12 |
| -0.2 | 0.36 | -0.38 | 0.29 | 0.49 | 0.1 | -0.37 | -0.45 | 0.01 |
| 0.33 | -0.18 | -0.26 | 0.1 | 0.32 | 0.37 | -0.16 | -0.19 | -0.42 |
| 0.13 | -0.47 | -0.29 | -0.04 | -0.43 | 0.15 | 0.37 | -0.29 | 0.46 |
| 0 | 0.31 | 0.28 | -0.1 | 0.08 | 0.15 | -0.41 | 0.45 | 0.31 |
| -0.08 | -0.47 | -0.24 | 0.15 | 0.45 | -0.36 | -0.24 | -0.2 | -0.25 |
| 0.47 | -0.42 | -0.1 | 0.17 | -0.29 | 0.39 | -0.16 | -0.5 | -0.41 |
| 0.25 | -0.38 | -0.41 | -0.43 | 0.19 | 0.4 | -0.28 | -0.1 | -0.33 |
| -0.33 | 0.33 | 0.03 | 0.49 | 0.18 | 0.33 | 0.41 | 0.44 | 0.49 |
| 0.49 | -0.27 | -0.23 | 0.43 | 0.3 | 0.16 | -0.37 | 0.18 | -0.23 |
FIG. 4

| 97 | 23 | 50 | 21 | 30 | 34 | 0 | 21 | 12 |
|---|---|---|---|---|---|---|---|---|
| 32 | 45 | 59 | 3 | 2 | 6 | 0 | 29 | 19 |
| 47 | 34 | 42 | 40 | 41 | 10 | 26 | 25 | 24 |
| 15 | 0 | 0 | 31 | 12 | 9 | 24 | 53 | 0 |
| 81 | 15 | 43 | 27 | 19 | 19 | 0 | 54 | 29 |
| 0 | 0 | 0 | 35 | 31 | 15 | 4 | 0 | 0 |
| 0 | 0 | 341 | 22 | 28 | 0 | 26 | 1 | 0 |
| 461 | 0 | 0 | 19 | 31 | 0 | 22 | 16 | 27 |
| 0 | 250 | 0 | 43 | 17 | 2 | 55 | 14 | 0 |
| 0 | 0 | 0 | 31 | 24 | 0 | 2 | 0 | 27 |
| 0 | 0 | 27 | 16 | 23 | 29 | 0 | 21 | 237 |
| 26 | 0 | 26 | 14 | 14 | 3 | 0 | 0 | 34 |
| 0 | 58 | 33 | 0 | 34 | 0 | 19 | 28 | 31 |
| 24 | 27 | 13 | 34 | 54 | 10 | 29 | 28 | 11 |

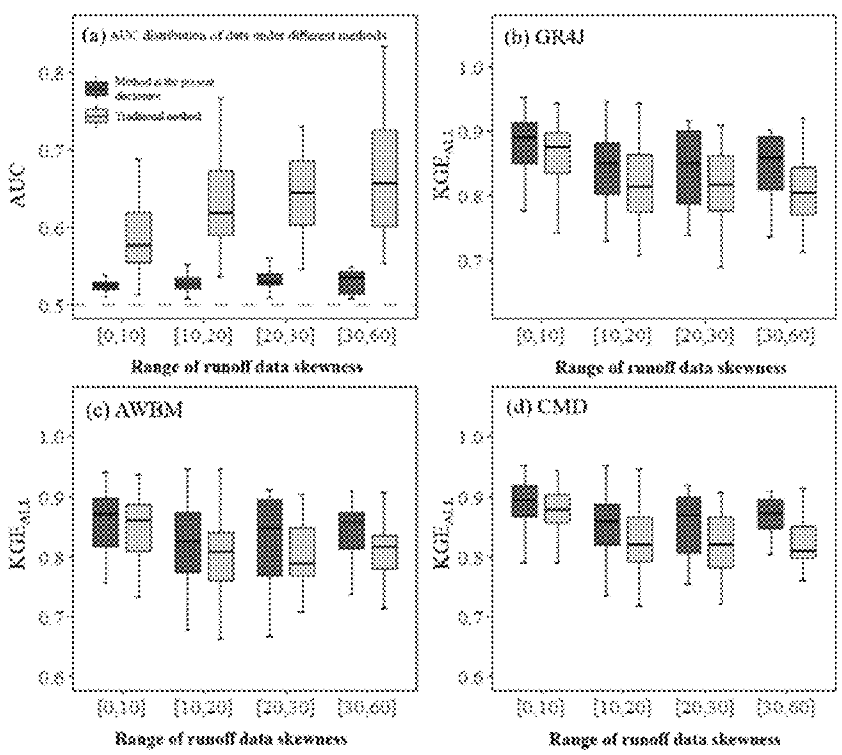
FIG. 12
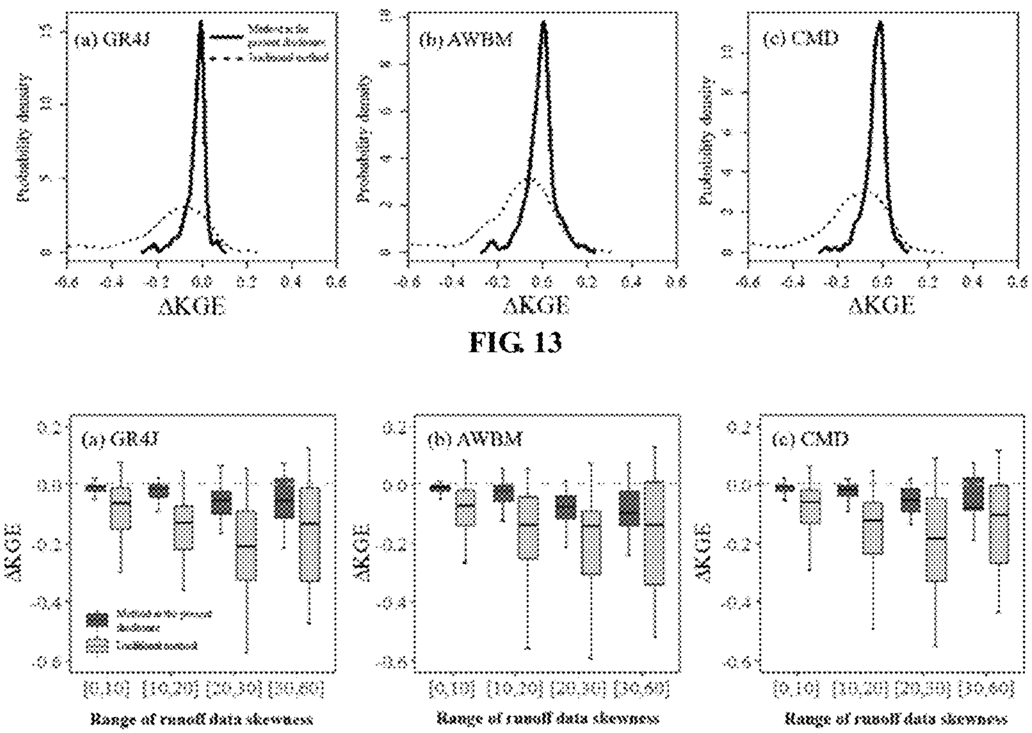
FIG. 13
FIG. 14

METHOD BASED ON CONSISTENCY OF DISTRIBUTION FEATURE OF CHECKING-VALIDATION DATA FOR ESTABLISHING HYDROLOGICAL PROCESS MODEL

TECHNICAL FIELD

The present disclosure belongs to the field of water conservancy, and particularly relates to the technology of establishment and use of hydrological process models.

BACKGROUND ART

Hydrological models are widely used, for example, used for runoff forecasting, flood and drought forecasting of a basin, assessing of the impact of climate change, etc. The hydrological models are divided into data-driven models and mechanism models. The former is to build a mathematical model between input conditions and output information by fully excavating the inherent evolution law of observation data so as to predict the future events. The data-driven models do not need to fully understand the true physical process of hydrology, so the modeling process is very simple. In recent decades, the data-driven modeling method has been proven to provide good prediction performance and have been successfully used in actual hydrological forecasting.

Before the use of a hydrological model, independent model checking and validation must be carried out. The former is mainly to determine relevant parameter values of the data-driven model, and the latter is to validate the effectiveness of these parameters in simulating a new situation. Therefore, observation data usually needs to be divided into two independent data sets, that is, a checking data set and a validation data set according to a certain proportion. Previous studies have found that the structural parameters obtained from the model in the calibration period can usually reproduce the hydrological behavior of the checking data set very well, but if the data of the validation data set and the checking data set have a large distribution difference, the model validation effect will be significantly reduced. For example, if the checking data are all drought hydrological events and the validation data are all hydrological data in flood season, the validation effect of the model is usually poor, thus influencing the practical engineering application of the model. The main reason for this problem is the lack of consistency of statistical distribution of the data in the checking and validation data sets, which leads to the over-optimistic or pessimistic estimation of the performance of the model and reduces the credibility of the prediction result of the model.

The direct method to solve this problem is to ensure that the observation data have similar statistical distribution after being assigned to the checking and validation data sets, so as to ensure that the model learns the effective information in the basin as much as possible and covers different degrees of hydrological events, and then determines the appropriate structural parameters of the model and evaluates the performance of the model correctly. In order to achieve this goal, a variety of data sampling methods have been established, including a Semi-Blind Source Separation (SBSS)-N method based on a self-organizing neural network (SOM) and a Neyman distribution principle, a DUPLEX method based on an Euclidean distance and single-linkage distance clustering algorithm, etc. The SBSS-N method is a stochastic method, and the results of each data allocation have certain differences, while the DUPLEX method is a deterministic method, and the results of each data allocation are consistent. Through a large number of basin sample tests, results show that the two traditional data allocation strategies have significantly higher effects than the complete random sampling method, and greatly improve the effectiveness of model checking, that is, the difference between the checking and validation results of the model is reduced compared with the random sampling method. However, the two methods also have significant drawbacks: the SBSS-N method has optimistic estimation of the model, that is, the validation effect tends to overestimate the true prediction ability of the model, while the DUPLEX method has obvious pessimistic estimation, that is, the validation effect tends to underestimate the true prediction ability of the model. These defects significantly influence the practical engineering application of the hydrological data-driven models.

The hydrological model based on a physical process is widely used in rainfall-runoff forecasting and drought-flood forecasting of a basin. The model has the fundamental feature of "process-driven" and is based on the quantitative study of water circulation to interpret the process of runoff formation. In general, the model structure and physical boundary conditions need to be determined according to theoretical basis before the establishment of the model, and the control body must obey the basic law of conservation of matter and energy, so the model can well explain the overall process of runoff formation.

However, the process model usually needs various simplifying assumptions in modeling, and the parameters need to be adjusted to better simulate the real rainfall-runoff process of current basin, so the model needs to be checked and validated before practical application. Checking refers to using historical data of a specific location to adjust the parameters of the model, and validation refers to using the checked model to predict independent data, so as to validate whether the model can provide good prediction results under new conditions that have not been seen.

Since the simulation results of the process-driven model are usually influenced by the initial state of the model, the hydrological process model usually needs time-continuous observation data for model checking. This leads to the inability of such models to use short, random, or small batches of data (data types commonly used in the field of traditional machine learning) for checking training. This is also an important essential difference between the hydrological process-driven model and the data-driven model.

According to the requirement that the hydrological process model needs time-continuous data to check, the traditional method is to divide the available continuous observation data into two parts of time series in proportion, one part is used for model checking and the other part is used for performance validation. However, this approach generally results in models that tend to perform significantly worse on the validation set than on the checking data set. This problem was discovered by some scholars as early as the 1980s, and its root cause is that there may be significant differences in hydrological conditions between the checking data set and the validation data set. For example, if the data in the checking data set is primarily representative of relatively humid hydrometeorological conditions, and the data in the validation data set is collected in a relatively arid condition, the effect of the model that is checked based on the humid will necessarily decrease significantly when validating drought hydrological events, and vice versa. In order to solve this problem, some researchers suggest that the checking data set should be extended as much as possible to ensure that the model can use data features in the full range of the basin through a large enough time span during the checking period. However, this approach is subjective, and previous studies have shown that its effect is often unsatisfactory. It can be seen that how to ensure the consistency of distribution of the checking and validation data to improve the performance of the hydrological process model is a difficult problem in the field of water conservancy, and is also an important reason to hinder the widespread practical application of the model.

In order to solve this problem, the present disclosure proposes a novel method based on the consistency of the distribution feature of the checking-validation data for establishing a hydrological process model, which completely abandons the traditional way of selecting time-continuous data for model checking, and instead uses a discrete sampling method to ensure the consistency of the distribution feature of the data of the checking and validation data sets. In this method, the model will run in a continuous mode from the beginning to the end in the entire data set, and then time discrete data is selected for model checking. In order to ensure the consistency of the distribution feature between the selected checking data and the validation data, the present disclosure also proposes a novel sampling method, that is, MDUPLEX, to complete the allocation of data sets. The present disclosure has the originality, completely changes the traditional establishment method of the hydrological overdrive model, and obtains the robust model performance and desirable portability, which is of great significance to the model work in the field of water conservancy.

SUMMARY

The technical problem to be solved by the present disclosure is: a method based on consistency of a distribution feature of checking-validation data for establishing a hydrological model is provided, which effectively combines a traditional self-organizing map (SOM) clustering method and a DUPLEX sampling method, divides observation data into checking and validation data sets reasonably, and guarantees consistency of performance of the hydrological process model during checking and validation periods by means of discrete sampling, so as to improve effectiveness of the hydrological process model and stability of engineering application.

The present disclosure specifically employs the following technical solution:

A method based on consistency of a distribution feature of checking-validation data for establishing a hydrological process model includes:

S1: implementing clustering of an original observation data set D by means of a self-organizing map (SOM) neural network according to S11-S15;

S11: computing a data size N in the original observation data set D, determining the number of a node M of the SOM according to empirical formula 1-1, and determining the number of a row r and the number of a column c of the network according to empirical formula 1-2, so as to determine a topology structure of the SOM neural network, where the specific formulas are as follows:

$$M=2\sqrt{N} \quad (1\text{-}1)$$

$$M=r\times c, r=1.6c \quad (1\text{-}2)$$

S12: performing weight value random initialization on each node in the SOM network, where a weight value is generally selected in a range from −0.5 to 0.5; and further standardizing data in the original observation data set D by means of z-score; and S13: putting the standardized original observation data set D into the SOM network for multiple rounds of training until convergence, where in such a case, various numbers of data are aggregated in each node in the SOM network, and data features in the same node are similar, and data features of different nodes are obviously different, and so far, preliminary clustering of the data is completed;

S2: using a traditional DUPLEX method to allocate the preliminarily clustered data in each node in the SOM network to a checking set C and a validation set E according to S21-S27;

S21: determining total data sizes required by checking and validation data sets according to a proportion designated by a user, and respectively recording the total data sizes as $n_C$ and $n_E$; and proportionally determining data sizes, for each node in the SOM network, that need to be allocated to C and E, respectively recording the data sizes as $n_C^{(m)}$ and $n_E^{(m)}$, where a specific computation formula is as follows:

$$n_C^{(m)}=|U^{(m)}|\frac{n_C}{N} \quad (1\text{-}3)$$

and computing $n_E^{(m)}$ similarly, where $|U^{(m)}|$ is a data size accumulated in the node;

S22: initializing, with regard to a current SOM node m, a local subset $C^{(m)}=E^{(m)}=\emptyset$ for data sampling of the current node;

S23: searching for a pair of data $x_i$ in the current SOM node m, where $x_j \in U^{(m)}$ maximizes an Euclidean distance $\|x_i-x_j\|$, and allocating the pair of data to $C^{(m)}$;

S24: repeating S23 to allocate data to $E^{(m)}$;

S25: searching for a next pair of data in the current SOM node m, where the first data has a largest single-linkage distance from $C^{(m)}$, and the second data comes second, and allocating the two data to $C^{(m)}$;

S26: repeating S25 to allocate data to $E^{(m)}$, continuously repeating S25, successively allocating data to the checking and validation data sets until one local subset reaches a set sampling number, and allocating remaining data directly to the other local subset; and S27: combining $C^{(m)}$ to C, and combining $E^{(m)}$ to E;

S3: proposing an idea of discrete checking of data for a hydrological process model according to S31-S32;

S31: setting the start of the overall data as a "start" phase, where the part of data does not participate in model checking and validation, and is only used for setting an initial parameter of the model so as to reduce an initialization error; and a structure of the used hydrological process model is specified by the user; and S32: discarding a traditional hydrological process model which uses continuous time series data for modeling, so as to guarantee a target of the consistency of the distribution feature of the data during a checking period and a validation period, and allocating runoff data to the checking and validation data sets discretely through a discrete data allocation method;

S4: using an MDUPLEX method to allocate an original runoff data set D to the checking set C and the validation set E according to S41-S48;

S41: backing up D and recording D as $D_b$, and determining proportions $P_C$ and $P_E$ of data allocated to C and E as required by the user;

S42: determining a size n (n pairs of data) of a basic sampling pool, where a computational formula is as follows:

$$n=\lfloor 1/\min(P_C,P_E)+0.5\rfloor \quad \text{1-4}$$

S43: determining the number of sampling pairs $n_C$ and $n_E$ allocated to C and E from the basic sampling pool:

$$n_C=\lfloor n\times P_C+0.5\rfloor \quad \text{1-5}$$

$$n_E=\lfloor n\times P_E+0.5\rfloor \quad \text{1-6}$$

S44: searching for a pair of data $x_i$ and $x_j$ with a largest Euclidean distance in D, and allocating same to C in a manner of sampling without replacement;

S45: repeating S44, and allocating a pair of data to E;

S46: searching for a next pair of data $x_i$ and $x_j$ in D, where the first data $x_i$ has a largest single-linkage distance from C, and the second data $x_j$ comes second;

S47: repeating S46, allocating a pair of data to E, and repeating the sampling manner until the allocation amounts $n_C$ and $n_E$ determined by the basic sampling pool is satisfied, where when one allocation amount reaches a requirement, all the sampled data pairs are allocated to the other data set; and S48: so far, completing sampling work of the first basic sampling pool, then entering a next basic sampling pool, and repeating S46-S47 until all the data in D are allocated to C and E; and S5: checking and validating the model according to S51-S52, determining a model parameter, and establishing the hydrological process model;

S51: running the model on $D_b$ in a continuous manner from the beginning to the end, where the data of the checking set C is used for model parameter selection; and S52: running the model continuously on $D_b$ again, and using the data of the validation set E to validate predicted performance of the model, such that model establishment is completed.

Compared with the prior art, the present disclosure has the following advantages:

(1) The present disclosure provides a novel dividing method for validation and checking data sets of a hydrological data-driven model, the method is superior to a traditional sampling method and may significantly improve checking effectiveness of the hydrological data-driven model; the present disclosure is an important contribution to the field of hydrological data-driven models, provides a new data pre-processing idea for hydrological modeling workers, effectively guarantees the accuracy of evaluation of prediction performance of the models, and has a wide range of practical engineering application value.

(2) Compared with a traditional checking method of a hydrological process model, the discrete checking method provided in the present disclosure has no requirement for a time series relation between data, which means that available data allocation methods are greatly increased, so as to maintain the consistency of a distribution feature of the data of the model during a checking period and a validation period.

(3) An MDUPLEX method provided in the present disclosure may effectively classify original observation data into subsets with similar distribution features, and there is no requirement for time span of the data.

(4) The present disclosure provides a novel idea of hydrological process model checking-validation, which may effectively solve the problem of inconsistent distribution features of the data allocated to this kind of model during the checking period and the validation period, so as to guarantee robustness of the model performance, make the model have good transferability, improve accuracy of simulation prediction of the model, and enhance the model reliability.

BRIEF DESCRIPTION OF THE DRAWINGS

FIG. 2 is a schematic diagram of locations of 717 basins in Embodiment 1.

FIG. 3 is a result of random initialization of a network node after running SOM in basin No. 50 in Embodiment 1.

FIG. 4 is a SOM clustering result in basin No. 50 in Embodiment 1.

FIG. 10 is a schematic diagram comparing a method in Embodiment 2 of the present disclosure with a traditional method.

FIG. 12 is a comparison diagram of the overall performance distribution of models after grouping according to the data runoff skewness in 163 basins in Embodiment 2.

FIG. 13 is a comparison diagram of changes, between a checking period and a validation period, in performance of models built through different methods in 163 basins in Embodiment 2.

FIG. 14 is a comparison diagram of changes, between a checking period and a validation period, in performance of models after grouping data runoff skewness in 163 basins in Embodiment 2.

DETAILED DESCRIPTION OF THE EMBODIMENTS

The present disclosure will be described in detail with reference to the accompanying drawings and embodiments, to make those skilled in the art better understand the essence of the present disclosure.

Figure 1:
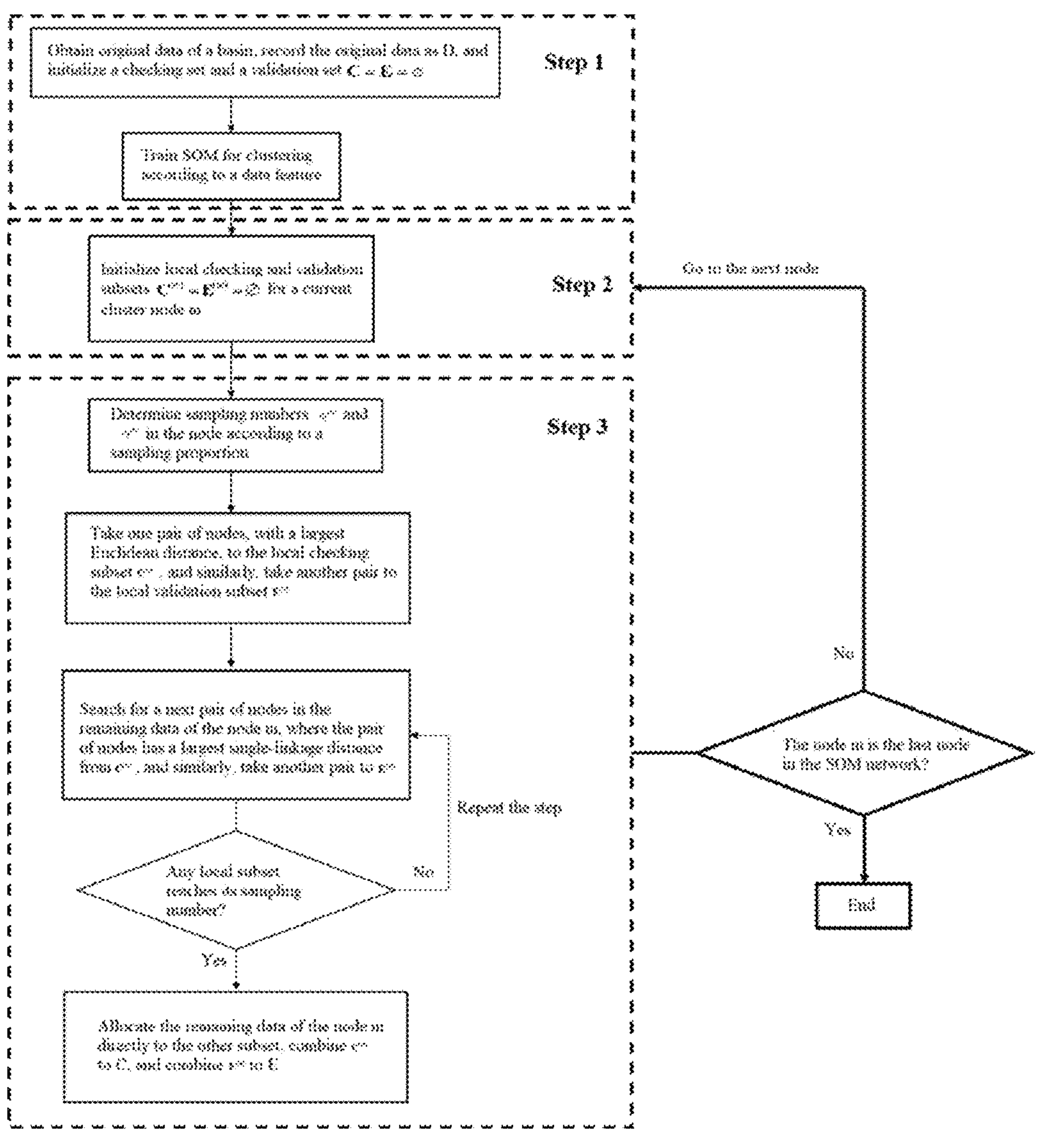
FIG. 1 is a route diagram showing specific implementation of Embodiment 1 of the present disclosure.

In Embodiment 1, with reference to FIG. 1, the present disclosure provides a method for improving checking effectiveness of a hydrological data-driven model, and the method includes:

The method for improving checking effectiveness of a hydrological data-driven model includes:

S1: implement clustering of an original observation data set D by means of a self-organizing map (SOM) neural network according to S11-S15;

S11: compute a data size N in the original observation data set D, determine the number of a node M of the SOM according to empirical formula 1-1, and determine the number of a row r and the number of a column c of the network according to empirical formula 1-2, so as to determine a topology structure of the SOM neural network, where the specific formulas are as follows:

$$M=2\sqrt{N}$$

$$M=r\times c, r=1.6c$$

S12: perform weight value random initialization on each node in the SOM network, where a weight value is generally selected in a range from −0.5 to 0.5; and further standardize data in the original observation data set D by means of z-score; and S13: put the standardized original observation data set D into the SOM network for multiple rounds of training until convergence, where in such a case, various numbers of data are aggregated in each node in the SOM network, and data features in the same node are similar, and data features of different nodes are obviously different, and so far, preliminary clustering of the data is completed;

S2: use a traditional DUPLEX method to allocate the preliminarily clustered data in each node in the SOM network to a checking set C and a validation set E according to S21-S27;

S21: determine total data sizes required by checking and validation data sets according to a proportion designated by a user, and respectively record the total data sizes as $n_C$ and $n_E$; and proportionally determine data sizes, for each node in the SOM network, that need to be allocated to C and E, respectively record the data sizes as $n_C^{(m)}$ and $n_E^{(m)}$, where a specific computation formula is as follows:

$$n_C^{(m)} = |U^{(m)}|\frac{n_C}{N}$$

and compute $n_E^{(m)}$ similarly, where $|U^{(m)}|$ is a data size accumulated in the node;

S22: initialize, with regard to a current SOM node m, a local subset $C^{(m)}=E^{(m)}=\emptyset$ for data sampling of the current node;

S23: search for a pair of data $x_i$ in the current SOM node m, where $x_j \in U^{(m)}$ maximizes an Euclidean distance $\|x_i-x_j\|$, and allocate the pair of data to $C^{(m)}$;

S24: repeat S23 to allocate data to $E^{(m)}$;

S25: search for a next pair of data in the current SOM node m, where the first data has a largest single-linkage distance from $C^{(m)}$, and the second data comes second, and allocate the two data to $C^{(m)}$;

S26: repeat S25 to allocate data to $E^{(m)}$, continuously repeat S25, successively allocate data to the checking and validation data sets until one local subset reaches a set sampling number, and allocate remaining data directly to the other local subset; and S27: combine $C^{(m)}$ to C, and combine $E^{(m)}$ to E; and S3: check and validate the hydrological data-driven model by using the checking set C and the validation set E.

Based on the description of the above method in the present disclosure, the description is combined with an specific implementation example to show specific technical effects thereof, and the specific steps of the method will not be described again.

One Application Example Based on Embodiment 1

A provided SOMPLEX method in the present disclosure has been tested on rainfall-runoff data sets of 717 basins. Distribution of locations of the basins is shown in FIG. 2, 315 basins are located in Australia and 402 basins are located in the United States, and area, rainfall, runoff skewness and evapotranspiration features of these basins are very different, which is sufficient for covering most of the real-world hydrological features. A distribution range of runoff data skewness is shown in FIG. 3. It can be seen that the distribution of the runoff data skewness in the basins is uneven, with a large number concentrated in 10, and the number of basins with larger skewness is less.

Data of basin No. 50 is selected to illustrate a running process of the SOMPLEX method:

(1) A basin data set is determined to have a length N=3650 and the data is standardized by means of z-score. A topology structure of the SOM network is determined according to S1, where the number of network nodes M=121 is computed by means of formula 1-1, the number of rows r=14 and the number of columns c=9 of the network are computed by means of formula 1-2, and a weight random initialization result of each node is shown in FIG. 4.

Figures 5, 6:
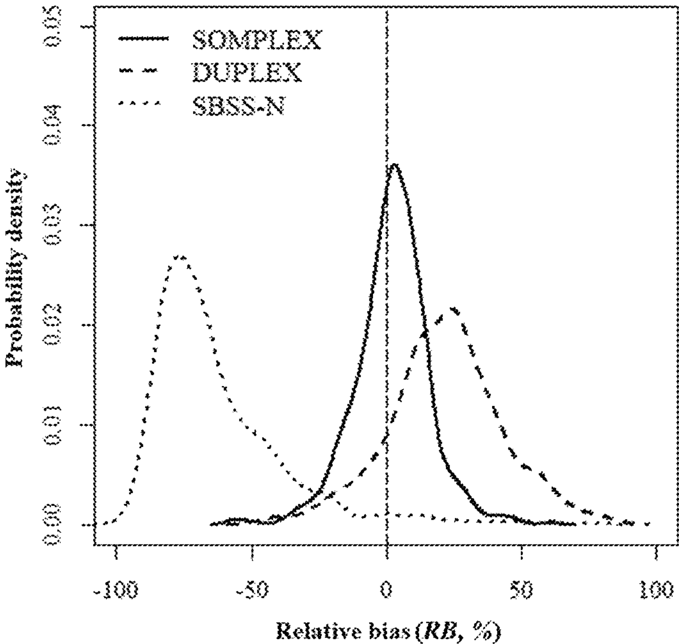
FIG. 5 is a skewness distribution diagram of runoff data of basins in Embodiment 1.
FIG. 6 is a relative bias distribution diagram of three methods in whole basins in Embodiment 1.

(2) After training of the SOM network is completed, a data size contained in each node is shown in FIG. 5.

(3) Allocation proportions of the checking set C and the validation set E are set as 80%/20%, such that required data sizes are $n_C$, =2930 $n_E$=720 and respectively.

(4) Data is allocated in each node successively, for example, the first node $U^{(1)}$ in FIG. 4 contains 97 data, and data sizes to be allocated to C and E in the node are computed to be $n_C^{(m)}=78$ and $n_E^{(m)}=19$ by means of formulas 1-3.

(5) The data in the node is allocated to two local subsets $C^{(m)}$ and $E^{(m)}$ in the manner of S2, and after the allocation ends, the two local subsets are combined into C and E respectively.

(6) When all nodes complete data allocation, SOMPLEX data allocation is completed.

In the following, the novel method provided in the present disclosure is implemented in 717 basins, a hydrological data-driven model is established by using the divided data, and performance of the method in the present disclosure and a traditional data allocation method in checking effectiveness of the hydrological data-driven model is statistically compared.

The reason for selecting a general regression neural network (GRNN) as a data-driven model for testing is that the GRNN has a simple structure and an error between output data and a training sample is only determined by a smoothing factor in a kernel function, and then the GRNN has a very simple performance control mode, and does not need to train a large number of parameters, so as to guarantee that training results of the neural network are only determined by the data, such that it is easy to compare the influence of each data allocation method on the training results of the model.

The checking data set C is used for training the GRNN and parameter selection, where a performance index of the model is evaluated with a root mean square error (RMSE). The trained GRNN evaluates, by means of the validation data set E, performance of the model which faces unseen data.

For each basin, the SOMPLEX method in the present disclosure and two traditional methods of DUPLEX and SBSS-N are separately randomly run for 100 times, each method obtains 100 data allocation results (each result consists of two data sets of C and E), and models are trained by using the respective allocation results accordingly, such that a total of 215100 (717*3*100) data-driven models are obtained for the whole process. For each basin, the model error RMSE obtained from 100 times of running of each method is computed by taking a mean value M and a reference value $\overline{M}$, where the reference value $\overline{M}$ of each basin is obtained by a lot of previous experimental studies, such that a relative bias (RB, %) of the prediction performance of the model may be computed, and a computational formula is as follows:

$$RB = \frac{M - \overline{M}}{\overline{M}} \times 100\% \quad (1\text{-}4)$$

717 RBs may be obtained from 717 basins, such that the effectiveness of all methods on data-driven model checking are compared statistically.

FIG. 6 is an RB distribution diagram of three methods in the whole basins. It can be seen from the figure that the SOMPLEX method provided in the present disclosure is obviously superior to the traditional DUPLEX and SBSS-N methods in evaluating the model performance, the traditional methods over-overestimate or underestimate the prediction performance of the model, while an evaluation result of the model by SOMPLEX is closer to its real performance, that is, an RB value is very small.

Figure 7:
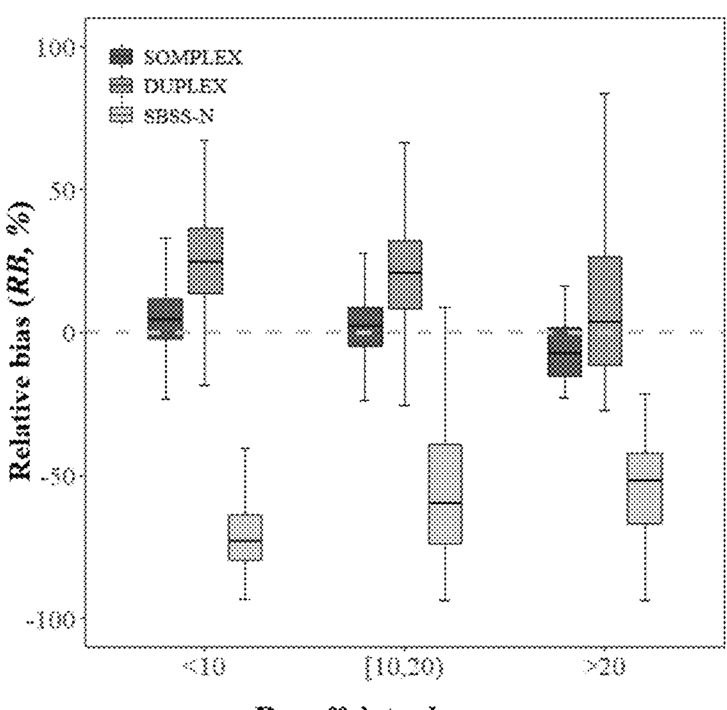
FIG. 7 is a relative bias distribution diagram of three methods at different runoff data skewness in Embodiment 1.

FIG. 7 is a RB distribution diagram of three methods at different runoff data skewness, and performance of the three methods at different data features are compared. It can be seen from FIG. 7 that RB distribution of the SOMPLEX provided in the present disclosure is significantly better than that of the traditional data allocation methods under various runoff data skewness conditions, which further confirms the superiority of the SOMPLEX method.

Figure 8:
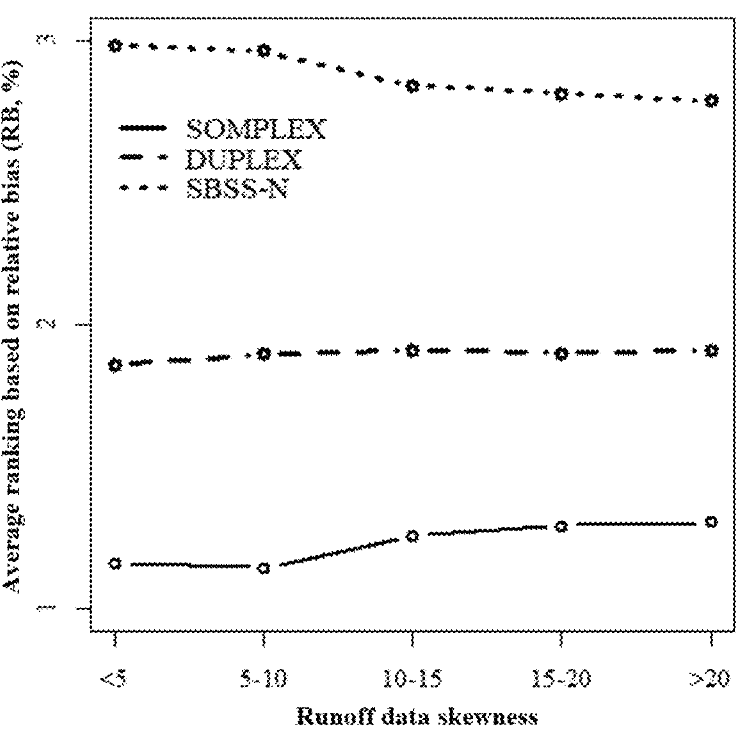
FIG. 8 is a comparison diagram of relations between average ranking and runoff data skewness of three methods in whole basins in Embodiment 1.

FIG. 8 is a comparison diagram of relations between average ranking and runoff data skewness of three methods in whole basins. The average ranking of each method is computed as follows: firstly, count RB absolute values |RB| of the three methods in each basin, wherein an order is from small to large; and compute the average ranking of each method in a classification according to the skewness classification of runoff data in FIG. 6.

It can be seen from FIG. 8 that the average ranking of the SOMPLEX is significantly better than that of the other two methods under each runoff data skewness, which once again reflects that this method has significant advantages in model performance evaluation.

It can be seen therefrom that a novel data allocation method provided in the present disclosure may effectively improve the checking effectiveness of a hydrological data-driven model and make a reasonable evaluation on the performance of the model. Therefore, the present disclosure has a wide application prospect, and provides a systematic data optimization allocation strategy for hydrological model establishment, so as to improve the reliability of model application, and has a desirable promotion and practical application value.

Figure 9:
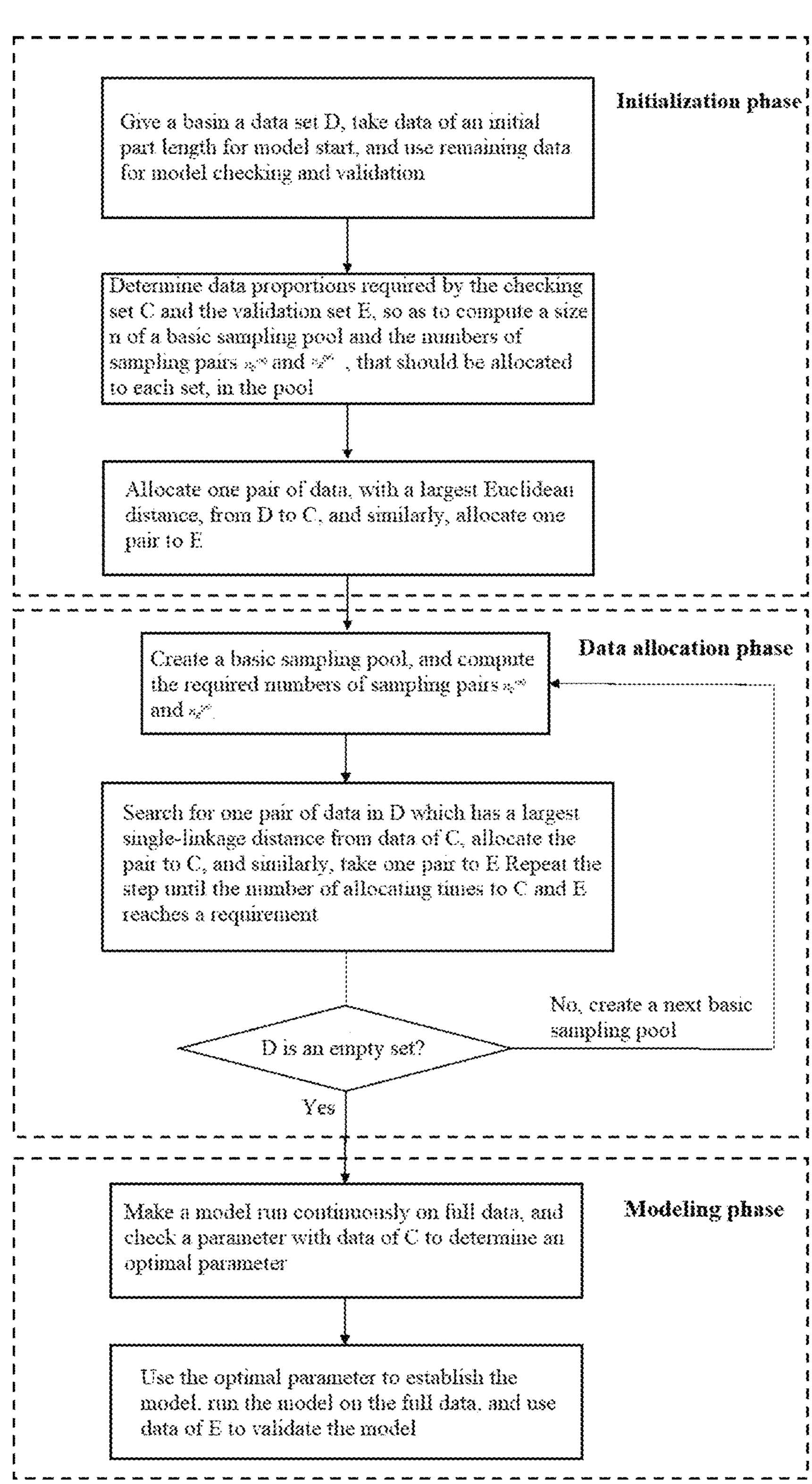
FIG. 9 is a route diagram showing specific implementation of Embodiment 2 of the present disclosure.

In Embodiment 1, with reference to FIG. 9, a method based on consistency of a distribution feature of checking-validation data for establishing a hydrological process model includes:

S1: propose an idea of discrete checking of data for a hydrological process model according to S11-S12;

S11: set the start of the overall data as a "start" phase, where the part of data does not participate in model checking and validation, and is only used for setting an initial parameter of the model so as to reduce an initialization error; and a structure of the used hydrological process model is specified by the user; and S12: discard a traditional hydrological process model which uses continuous time series data for modeling, so as to guarantee a target of the consistency of the distribution feature of the data during a checking period and a validation period, and allocate runoff data to the checking and validation data sets discretely through a discrete data allocation method;

S2: use an MDUPLEX method to allocate an original runoff data set D to a checking set C and a validation set E according to S21-S28;

S21: back up D and recording D as $D_b$, and determine proportions $P_C$ and $P_E$ of data allocated to C and E as required by the user;

S22: determine a size n (n pairs of data) of a basic sampling pool, where a computational formula is as follows:

$$n=\lfloor 1/\min(P_C,P_E)+0.5 \rfloor$$

S23: determine the number of sampling pairs $n_C$ and $n_E$ allocated to C and E from the basic sampling pool:

$$n_C=\lfloor n \times P_C+0.5 \rfloor$$

$$n_E=\lfloor n \times P_E+0.5 \rfloor$$

S24: search for a pair of data $x_i$ and $x_j$ with a largest Euclidean distance in D, and allocate same to C in a manner of sampling without replacement;

S25: repeat S24, and allocate a pair of data to E;

S26: search for a next pair of data $x_i$ and $x_j$ in D, where the first data $x_i$ has a largest single-linkage distance from C, and the second data $x_j$ comes second;

S27: repeat S26, allocate a pair of data to E, and repeat the sampling manner until the allocation amounts $n_C$ and $n_E$ determined by the basic sampling pool is satisfied, where when one allocation amount reaches a requirement, all the sampled data pairs are allocated to the other data set; and S28: so far, complete sampling work of the first basic sampling pool, then enter a next basic sampling pool, and repeat S26-S27 until all the data in D are allocated to C and E; and S3: check and validate the model according to S31-S32, determine a model parameter, and establish the hydrological process model;

S31: run the model on $D_b$ in a continuous manner from the beginning to the end, where the data of the checking set C is used for model parameter selection; and S32: run the model continuously on $D_b$ again, and use the data of the validation set E to validate predicted performance of the model, such that model establishment is completed.

FIG. 10 is a schematic diagram comparing the method in the present disclosure with the traditional method, and it can be seen that a core idea of the present disclosure is to obtain better model performance by means of discrete checking of data.

Based on the method, the method is combined with an specific embodiment to show specific technical effects thereof, and the specific steps of the method will not be described again.

One Application Example Based on Embodiment 2

The method provided in the present disclosure and a traditional continuous data checking method are used in a conceptual rainfall runoff model, which is a hydrological model based on a real physical process. The advantages of the present disclosure are demonstrated by testing a large number of basin models in a statistical sense.

Three well-known process conceptual rainfall runoff (CRR) models of GR4J, AWBM, CMD are selected for testing, data sets selects public 163 basins, basin data are analyzed and processed by predecessors, each data time span is more than 30 years, which meets data length requirements by the CRR models.

An evaluation index of model performance uses knowledge graph embedding (KGE), and a value range is from negative infinity to 1, and the closer the KGE is to 1, the better fitting performance of the model is. To facilitate evaluation of the overall simulation performance of the model and the robustness at different time periods, $KGE_{ALL}$ is defined here as an overall KGE value of the model on the entire data sets, and ΔKGE is defined as a difference between KGE values of the model in a validation period and a checking period.

In addition, the idea of a generative adversarial network is used to train a classifier by means of adversarial validation to evaluate the consistency of distribution of the data of the model in the checking period and the validation period, and an evaluation index uses an area under curve (AUC). Under the condition that an AUC value is close to 0.5, it is indicated that distribution features of data of two data sets are consistent, and the classifier may not distinguish a source of data, and under the condition that the AUC value is close to 1, it is indicated that a distribution difference between the two data sets is very obvious, and the classifier may accurately distinguish the source of data.

A monitoring station data of basin No. 10 is selected, and the GR4J is used as a model structure to demonstrate a specific implementation process of the model establishment method provided in the present disclosure:

(1) The data set has a recording range from Jan. 1, 1970 to Dec. 31, 2013 with precision in days and total data length of 16071. The data of initial 365 days is taken as a model "start" phase for initializing a model parameter.

(2) Proportions of data used in a checking period and a validation period are set as $P_C=0.6$ and $P_E=0.4$, then a data size required for C is 9643, and a data size required for E is 6428.

(3) One pair of data is taken to each of C and E in a manner of S24.

(4) A total number of sampling pairs in a basic sampling pool is determined as n=3 by means of formula 1-1, and the number of the sampling pair assigned to C and E are computed to be $n_C=2$ and $n_E=1$ by formulas 1-2 and 1-3.

(5) Every three sampling times is taken as a basic sampling pool in a round, in each sampling pool, a pair of data is sampled to C according to S26, then a pair of data is further sampled to E, in such a case, the number of sampling times for E in the sampling pool in the round reaches a requirement, and only a pair of data needs to be further sampled to C to end the sampling round.

(6) Under the condition that D still has data, a next round of sampling of the basic sample pool is performed.

(7) After all the data are allocated, all the data (that is, a backup of D) are used for modeling, the data in C is used for a checking position of the model parameters, and a set of optimal parameters is searched to maximize a KGE value of a simulation value and an observation value at each point position in C. In the current basin No. 10, the KGE of the checking period is KGE=0.82.

(8) A model is established by using the parameters obtained after checking, data used by the model is still all the data (that is, 16071 data), a simulation value and an observation value of each point, corresponding to a position of the model, in E are compared to compute a KGE value, and a degree of change in simulation performance of the model may be obtained by comparing the KGE values in two periods. In the current basin No. 10, the KGE of the validation period is KGE=0.81, and it may be known that ΔKGE=−0.01, which indicates that the model built by using the method in the present disclosure has extremely high robustness in basin No. 10.

In order to compare effects of the method in the present disclosure and traditional CRR modeling methods, the method in the present disclosure and the traditional three methods are used for modeling in 163 basins, so as to statistically compare influences of different modeling methods on the model performance.

Figure 11:
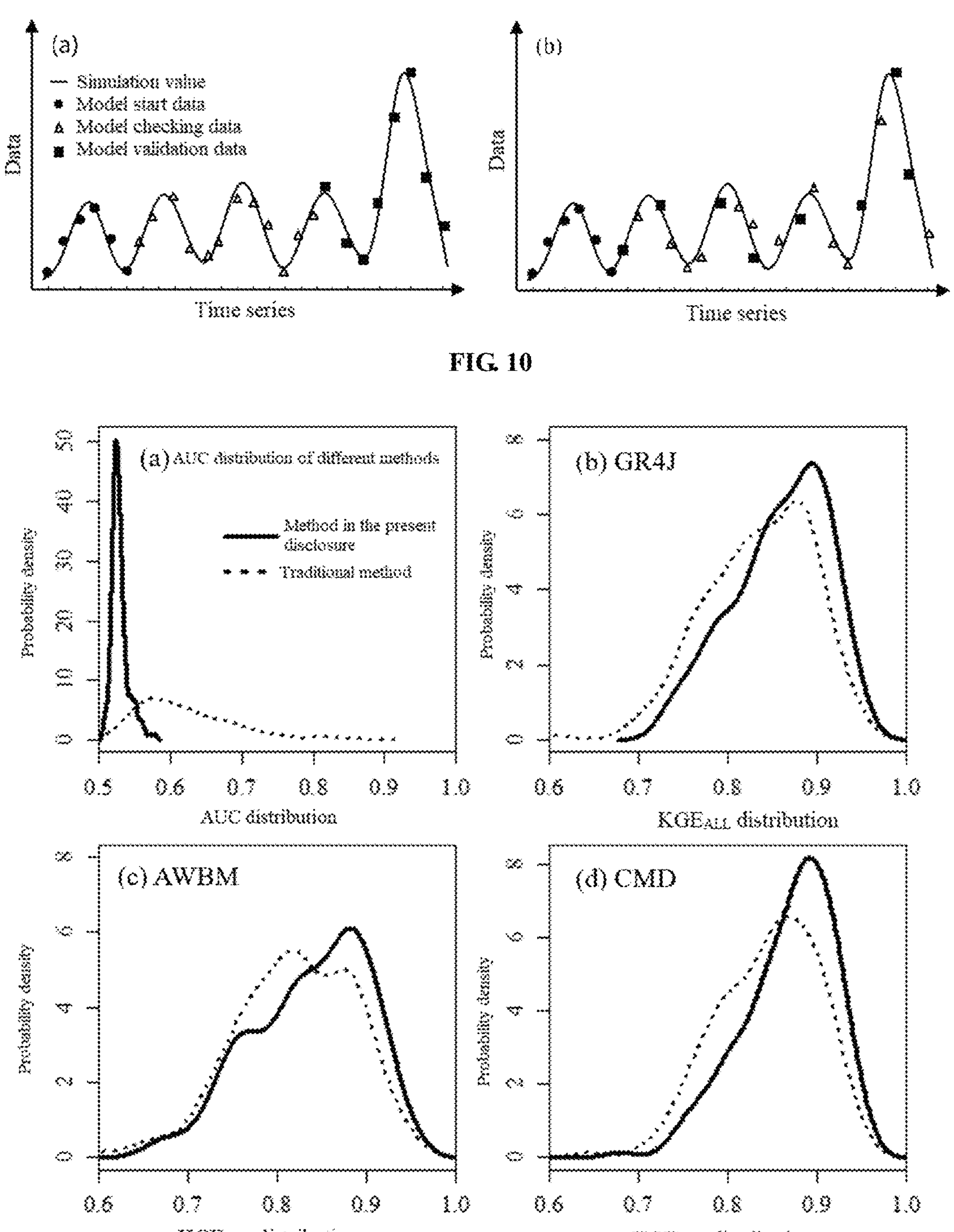
FIG. 11 is a comparison diagram of overall performance distribution of models established through different methods in 163 basins in Embodiment 2.

FIG. 11 is a comparison diagram of overall performance of models established through the method in the present disclosure and the traditional methods in the 163 basins, the comparison diagram includes distribution of AUC and $KGE_{ALL}$, and each line in the diagram contains 163 data. It can be seen from FIG. 11 (*a*) that the distribution features of the data selected by using the MDUPLEX method by means of discretizing may maintain high consistency during the checking period and the validation period, and the distribution of AUC is basically maintained between 0.5 and 0.6. The traditional modeling methods obviously lead to inconsistent of feature distribution of the data during the checking period and the validation period, and the distribution of AUC values from 0.5 to 0.9, which is consistent with previous results. (b), (c) and (d) in FIG. 11 are comparison results of the overall performance of the models respectively established through the method in the present disclosure and the traditional methods in three different CRR models, and it can be seen from the results that the model performance obtained by the method in the present disclosure has a statistically significant advantage compared with the traditional CRR modeling methods.

FIG. 12 is a group comparison of the results in FIG. 11 according to runoff data skewness to account for an influence of a data feature (data distribution skewness) of the basin itself. As can be seen from a result in FIG. 12, when the data skewness is small, the $KGE_{ALL}$ obtained by the method in the present disclosure and by the traditional methods are higher, with a median around 0.9. This is because when the data skewness is small, the difference of the distribution features of the data between the checking period and the validation period is relatively small, and the traditional methods may also obtain better performance. However, when the data skewness of the basin is large, the advantages of the method in the present disclosure are significantly improved. Under the three CRR models, the median of the $KGE_{ALL}$ value of the method in the present disclosure is above 0.85, while those of the traditional methods decrease to about 0.8. This shows that the overall performance of the model obtained by the method in the present disclosure is significantly better than that obtained by the traditional methods in a high-data-skewness basin.

FIG. 13 is a comparison diagram of the performance differences, between the checking period and the validation period, of the models established in all 163 basins, and the closer a value of ΔKGE is to 0, the smaller the performance change of the model is, that is, the more robust the model is. As can be seen from results of FIG. 13, ΔKGE distribution of the method in the present disclosure is largely concentrated between −0.1 and 0, while ΔKGE distribution of the traditional methods is distributed between −0.6 and 0. It can be seen therefrom that a performance decline of the model under the method in the present disclosure is significantly less than that of the models under the traditional three continuous data validation checking methods in the validation period, which also shows that the way of discrete data sampling may make the model learn a real hydrological process in the basin to a greater extent, parameters obtained by the model training in the checking period do not over-fit the data of the checking set, and better performance may still be maintained in the validation period.

FIG. 14 is a group comparison of the results of FIG. 13 according to runoff data skewness to compare a degree of change in model performance, in two periods, obtained through the method in the present disclosure and the traditional method under different data features. It can be seen from the results in FIG. 14 that when the runoff data skewness increases, the performance difference of the model in the checking period and the validation period will obviously increase. The performance difference of the method in the present disclosure has a very obvious advantage in a high-skewness basin, and the ΔKGE distribution is largely concentrated between −0.2 and 0, while the ΔKGE distribution of the traditional methods is distributed from −0.6 to 0. The results of FIG. 14 illustrate that the model of the method in the present disclosure is significantly more robust than those of the traditional methods at different time periods in a high-skewness basin.

It can be seen from the above results that the discrete hydrological process model checking method provided in the present disclosure has an extremely obvious advantage compared with the current traditional continuous data sampling modeling method, and may effectively improve overall performance and prediction performance of a conceptual rainfall runoff model, and a performance difference of the obtained model in a checking period and a validation period is significantly reduced. In addition, a range of application of the model establishment method in the present disclosure is not limited to the three CRR models used in the embodiments, and based on a principle of consistency of a distribution feature of checking-validation data, the model establishment method provided in the present disclosure may theoretically be widely used in any other process-based hydrological process models, has a wide application prospect, and has a desirable promotion and practical application value.

What is claimed is:

1. A method based on consistency of a distribution feature of checking-validation data for establishing a hydrological process model, comprising:

S1: implementing clustering of an original observation data set D by means of a self-organizing map (SOM) neural network according to S11-S15;

S11: computing a data size N in the original observation data set D, determining the number of a node M of the SOM according to empirical formula 1-1, and determining the number of a row r and the number of a column c of the network according to empirical formula 1-2, so as to determine a topology structure of the SOM neural network, wherein the specific formulas are as follows:

$$M = 2\sqrt{N} \qquad 1\text{-}1$$

$$M = r \times c,\ r = 1.6c \qquad 1\text{-}2$$

S12: performing weight value random initialization on each node in the SOM network, wherein a weight value is generally selected in a range from −0.5 to 0.5; and further standardizing data in the original observation data set D by means of z-score; and S13: putting the standardized original observation data set D into the SOM network for multiple rounds of training until convergence, wherein in such a case, various numbers of data are aggregated in each node in the SOM network, and data features in the same node are similar, and data features of different nodes are obviously different, and so far, preliminary clustering of the data is completed;

S2: using a traditional duplex method to allocate the preliminarily clustered data in each node in the SOM network to a checking set C and a validation set E according to S21-S27;

S21: determining total data sizes required by checking and validation data sets according to a proportion designated by a user, and respectively recording the total data sizes as $n_C$ and $n_E$; and proportionally determining data sizes, for node m in the SOM network, that need to be allocated to C and E, respectively recording the data sizes as $n_C^{(m)}$ and $n_E^{(m)}$, wherein a specific computation formula is as follows:

$$n_C^{(m)} = \left|U^{(m)}\right| \frac{n_C}{N} \qquad 1\text{-}3$$

and computing (m) similarly, wherein $\|U^{(m)}|$ is a data size accumulated in the node;

S22: initializing, with regard to a current SOM node m, a local subset $C^{(m)}=E^{m)}=\varnothing$ for data sampling of the current node;

S23: searching for a pair of data $x_i$ in the current SOM node m, wherein $x_j \in U^{(m)}$ maximizes an Euclidean distance $\|x_i - x_j\|$, and allocating the pair of data to $C^{(m)}$, where i and j denote data identifiers within the pair of data;

S24: repeating S23 to allocate data to $E^{(m)}$,

S25: searching for a next pair of data in the current SOM node m, wherein the first data has a largest single-linkage distance from $C^{(m)}$, and the second data comes second, and allocating the two data to $C^{(m)}$;

S26: repeating S25 to allocate data to $E^{(m)}$, continuously repeating S25, successively allocating data to the checking and validation data sets until one local subset reaches a set sampling number, and allocating remaining data directly to the other local subset; and S27: combining $C^{(m)}$ to C, and combining $E^{(m)}$ to E;

S3: proposing an idea of discrete checking of data for a hydrological process model according to S31-S32;

S31: setting the start of the overall data as a "start" phase, wherein the part of data does not participate in model checking and validation, and is only used for setting an initial parameter of the model so as to reduce an initialization error; and a structure of the used hydrological process model is specified by the user; and S32: discarding a traditional hydrological process model which uses continuous time series data for modeling, so as to guarantee a target of the consistency of the distribution feature of the data during a checking period and a validation period, and allocating runoff data to the checking and validation data sets discretely through a discrete data allocation method;

S4: using an mduplex method to allocate an original runoff data set D to the checking set C and the validation set E according to S41-S48;

S41: backing up D and recording D as $D_b$, and determining proportions $P_C$ and $P_E$ of data allocated to C and E as required by the user;

S42: determining a size n (n pairs of data) of a basic sampling pool, wherein a computational formula is as follows:

$$n = \lfloor 1/\min(P_C, P_E) + 0.5 \rfloor \quad 1\text{-}4$$

S43: determining the number of sampling pairs $n_C$ and $n_E$ allocated to C and E from the basic sampling pool:

$$n_C = \lfloor n' P_C + 0.5 \rfloor \quad 1\text{-}5$$

$$n_E = \lfloor n' P_E + 0.5 \rfloor \quad 1\text{-}6$$

S44: searching for a pair of data $x_i$ and $x_j$ with a largest Euclidean distance in D, and allocating same to C in a manner of sampling without replacement;

S45: repeating S44, and allocating a pair of data to E;

S46: searching for a next pair of data $x_i$ and $x_j$ in D, wherein the first data $x_i$ has a largest single-linkage distance from C, and the second data $x_j$ comes second;

S47: repeating S46, allocating a pair of data to E, and repeating the sampling manner until the allocation amounts $n_C$ and $n_E$ determined by the basic sampling pool is satisfied, wherein when one allocation amount reaches a requirement, all the sampled data pairs are allocated to the other data set; and S48: so far, completing sampling work of the first basic sampling pool, then entering a next basic sampling pool, and repeating S46-S47 until all the data in D are allocated to C and E; and S5: checking and validating the model according to S51-S52, determining a model parameter, and establishing the hydrological process model;

S51: running the model on $D_b$ in a continuous manner from the beginning to the end, wherein the data of the checking set C is used for model parameter selection; and S52: running the model continuously on $D_b$ again, and using the data of the validation set E to validate predicted performance of the model, such that model establishment is completed.

* * * * *